Oct. 31, 1933.         W. S. CLARK         1,933,313
CABLE SYSTEM
Filed Aug. 22, 1928

Inventor
Wallace S. Clark,
by Charles E. Tullar
His Attorney.

Patented Oct. 31, 1933

1,933,313

UNITED STATES PATENT OFFICE 1,933,313

CABLE SYSTEM

Wallace S. Clark, Schenectady, N. Y., assignor to General Electric Company, a corporation of New York Application August 22, 1928. Serial No. 301,407

12 Claims. (Cl. 173—264)

The present invention relates to cable systems of the type containing fluid as an insulating medium in addition to paper or other insulating material which is applied directly to the conductor or conductors, the cable being enclosed in a lead or equivalent sheath. In such a system the established practice is to employ a number of sealed pressure reservoirs which are connected to the interior of the cable sheath at suitable intervals along its length to receive the fluid from the cable as it expands and to return the fluid as it cools. There is also provided at some suitable point a supply reservoir which feeds fluid directly into the fluid channel of the cable and the only way that such fluid can reach the sealed reservoirs which may be several hundred feet from the point of supply is through said channel. As the channel is of necessity long and relatively small in cross-section and not very smooth, substantial resistance is offered to the flow of fluid from the main supply into the reservoirs and hence the flow is sluggish.

To take care of small leakages which may occur at the joints or in the sheath or both, the reservoirs are purposely made appreciably larger than is required to take care of normal conditions due to expansion and contraction of the fluid as the cable heats and cools. These reservoirs are expensive and occupy valuable space either in manholes in the city streets or in special housings erected therefor above the level of the streets. Furthermore such systems require frequent inspection to determine whether the pressure reservoirs contain a sufficient amount of fluid.

My invention has for its object an improved cable system in which sealed reservoirs of comparatively small size may be utilized, and which, instead of depending for their supply of fluid on the cable itself, are supplied from a source which is separate from the cable which source is directly piped to the reservoirs where it is available at all times and in sufficient quantity to supply all demands.

For a consideration of what I believe to be novel and my invention, attention is directed to the accompanying description and the claims appended thereto.

Figure 1:
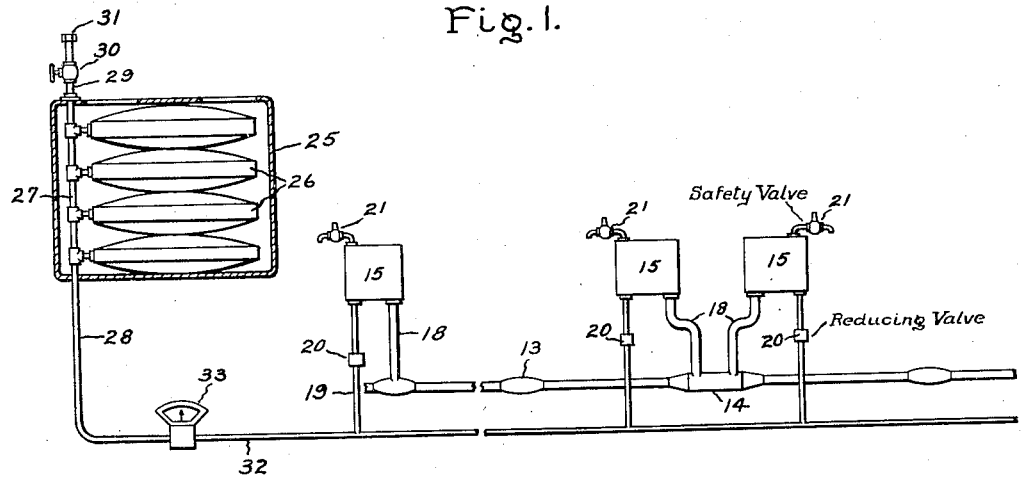
Figure 2:
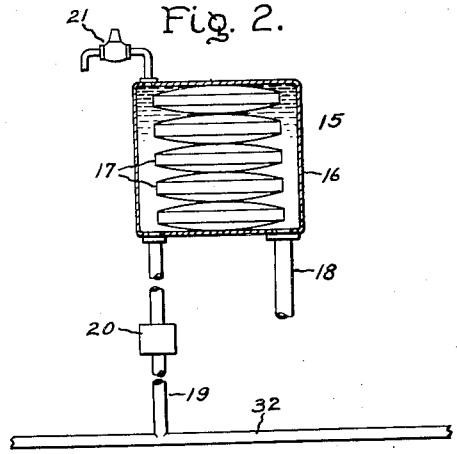
Figure 3:
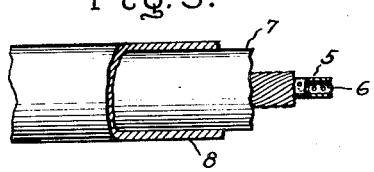

In the accompanying drawing which is illustrative of my invention, Fig. 1 is a diagrammatic view of an underground high tension cable system; Fig. 2 is a view in section of a reservoir or container; Fig. 3 is a view partly in elevation and partly in section of a single conductor cable; and Fig. 4 is a cross-sectional view of a multiple conductor cable.

The particular construction of the cable is not material except that suitable channel means must be provided therein to contain the fluid insulation which is or may be thin oil. In Fig. 3, 5 indicates the conductor which is hollow and contains an oil channel 6 in the center thereof, which is of such character that the oil can freely flow therefrom into and through the insulation. In this particular the established practice may be followed. Surrounding the conductor are layers of paper or other good insulation 7 which are impregnated with oil from the channel. Surrounding the paper is a sheath 8 of lead or equivalent material.

Figure 4:
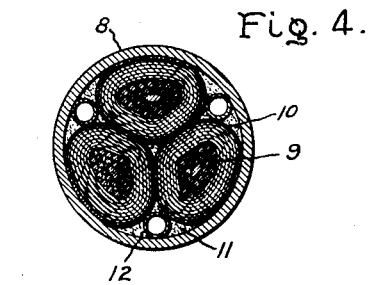

In Fig. 4 is illustrated a cable having three stranded conductors 9 each of which is suitably insulated and which may be covered with thin perforated metal tapes 10 to distribute electrical stresses. Surrounding the conductors and their insulations and tapes is a lead sheath 8. In the spaces 11 defined by the exterior walls of the conductor elements and the inner wall of the sheath are formed or located suitable channels 12 through which oil is free to flow and which permeates the paper insulation from the outside toward the center of each conductor. Whether the channels be in the center of the conductor as shown in Fig. 3 or outside thereof as shown in Fig. 4, they must of necessity be relatively small so as not to unduly enlarge the cable structure, and in this connection it should be borne in mind that the cost of the cable increases very rapidly with an increase in diameter. The fact that the channels are relatively small in cross section means that the flow of fluid is rather slow through them. The resistance to flow is increased due to the fact that the channels do not have smooth walls.

The cable may be laid in conduits or in any suitable way and is divided into sections for convenience in manufacture; and to prevent too great hydrostatic pressure in any given portion after installing. The sections are electrically connected in the usual way and the joints or splices are enclosed in casings 13 which are connected by wiped soldered joints to the adjacent ends of the sheaths. At suitable intervals are located what are termed stop joints 14. They may be of any suitable or well-known construction and their purpose is three-fold, first to connect two adjacent sections electrically; second, to prevent the flow or migration of oil from one section to the next, and, third, to permit of the introduction of oil from an external source to the one or more channels within the cable. The second feature is necessary where the cable is laid over hilly ground to prevent undue hydrostatic head of the oil at the low spots. In all these respects the standard practice may be followed.

15 indicates one of the pressure reservoirs of the system and comprises an hermetically sealed container 16 made of relatively thin metal and a number of hermetically sealed cells 17, each of which has walls of thin flexible metal which yield in response to pressure changes of the oil, said cells being submerged in the fluid in the container. These reservoirs of which as many may be provided as is considered good engineering practice for each installation will be hereinafter referred to as pressure reservoirs in distinction from the main or supply reservoir which contains a relatively large amount of oil. They are connected in parallel to the cable at suitably spaced intervals. The walls of the cells 17 are normally distended by varying amounts by any suitable means, as for example, by elastic fluid which is confined within the cells under suitable pressure acting in opposition to the pressure within the container. Preferably for this purpose a gas is used which in the event of rupture of a cell will be absorbed by the oil. On account of the fact that the walls of the cells are elastic they will quickly respond to any change of pressure within the container as oil from the cable flows into or from it. In this manner the cells serve to compensate for the more sluggish flow of oil from the main source of supply to be referred to later.

Each pressure reservoir is connected to the cable, usually at one of the joints, by the pipe 18 leading from the bottom thereof. Oil from the main source is supplied to each reservoir by pipe 19 which contains a pressure reducing valve 20 of any suitable construction. It is preferable to use an adjustable valve so that the pressure of the oil admitted will be that best suited for the operating conditions of the particular section of cable supply by the pipe 19.

In other words, each of these valves will maintain a certain minimum pressure in the reservoir with which it is associated. To limit the pressure within the reservoir an adjustable safety valve 21 is provided which is set to limit the maximum pressure therein. These reservoirs should be large enough to supply all or the major part of the oil needed by the cable sections and their various joints when the parts are at their lowest temperature and also to receive all the surplus oil due to expansion of the parts when heated. In addition they may have some surplus capacity to take care of small leaks, because it is highly undesirable to permit air to enter the cable which it would do in the absence of an outward flow of oil.

25 indicates the main reservoir or main source of supply which has sufficient capacity to keep the pressure reservoirs and their connected piping filled with oil at all times plus a sufficient reserve supply to take care of any leaks in the cable system. The reservoir 25 may be located at either end of a cable section or at any other convenient place, or more than a single reservoir may be connected to the same section. The total number on a system will vary with its length and will be governed largely by the contour of the surface of the ground in which the cable is laid, the size of pipe employed to carry the oil and the viscosity of the oil itself.

Inside of an open-work frame or shell of the reservoir is a plurality of cells 26 which generally resemble those previously described, but they are substantially larger and differ in these important particulars, they are filled with oil instead of gas, are exposed on their external surfaces to atmospheric pressure and are connected in parallel to a manifold 27 which in turn delivers oil to the system through pipe 28. Generally the supply reservoir will be elevated so as to maintain the desired pressure in the system, say of the order of 25 lbs. per square inch static head, or it may be higher if the system runs up hill from the reservoir. To fill the cells initially or to replenish them with oil the manifold is provided with a connection 29 at the top containing a suitable valve 30 and a pipe coupling 31. 32 indicates the supply pipe which receives oil under pressure from the main reservoir through pipe 28 and feeds it in parallel to the various pressure reservoirs 15 located along the cable. The pressure of the fluid in this pipe should be somewhat greater than that within the reservoirs and be admitted thereto through suitable reducing valves 20. The supply pipe being small may be located in the same conduit as the cable itself or it may be located in a spare conduit or other suitable place. The pipe 32 may be arranged to feed any number of cable lines passing through the manholes, and this whether they are of the single or multiple conductor type.

The pipe 32 although relatively small has smooth walls and a bore large enough to convey all the fluid that is necessary to supply the pressure reservoirs under all normal conditions, and in addition enough fluid to take care of leakages for a considerable period of time until such leakages are detected and the necessary repairs made. The resistance to flow of fluid in the pipes 28, 32 and 19 is appreciably less than the resistance to flow in the channel or channels in the cable, and by this arrangement fluid is quickly available at each and every one of the pressure reservoirs without having to flow through one of the longitudinal channels within the cable itself. This is particularly important where the cable section is long and where under the prior practice the fluid would have to flow through what might be the entire, or practically the entire section before reaching the point of leakage. By using the separate source of supply and numerous pressure reservoirs arranged as described, a supply of fluid is available at all times to take care of leakages. The fact that the fluid is separately piped with a reducing valve between the pipe and the pressure reservoir means that the available pressure to force the fluid may be much greater than it would be safe to employ with a cable having a lead sheath as the strength of the latter is relatively low.

In order that a leak in the system may be quickly determined a flow meter 33 is located in the supply pipe 32 or the pipe 28 at some convenient place where it can readily be observed. Under normal conditions, after the cable is once installed and working properly only a small amount of oil will flow from the main reservoir to the system, but nevertheless it stands ready to deliver any quantity of oil which is necessary to take care of leakages in the cable and joints and any oil, which may be discharged by the safety valves 21 on the pressure reservoirs.

In a system of this character depending as it does on oil to fully impregnate the insulation on the conductors and fill all voids within the cable system, it is important that upon a reduction in volume of the oil in the cable due to cooling, a supply of oil shall be quickly available. This condition is met by the use of cells 17 in the pressure reservoirs which being elastic in their nature promptly act to force oil from the container back into the cable. In other words, these cells quickly change the volumetric capacity of the reservoir in response to changed conditions within the cable. This action, if the drop in pressure in the reservoir is sufficiently great, is followed by a fresh supply of oil from the pipe 32 and the main reservoir through the reducing valve 20. In some cases both the cells and supply pipe will act simultaneously depending upon how great the demand is for fresh oil. It is important of course to use the same oil in the cable that is used in the main reservoir, because the two mix within the pressure reservoirs, also the oil should be rather thin so as not to offer too great a resistance to flow even in extremely cold weather. It is also important to free the oil of air before using as completely as possible and to prevent all leaks in the sheathing, joints, piping, etc. By maintaining a pressure within the system above that of the atmosphere oil will flow outward through any defective sheath, joint or other part and in so doing prevent the entrance of any foreign matter. Should the flow meter 33 indicate the flow of an excessive amount of oil, the cable should be removed from service as promptly as possible and the necessary repairs made.

By the use of a feeding reservoir which is directly piped to the pressure reservoirs of the system, as distinguished from a system in which the feeding reservoir is connected to an oil channel wholly within the cable, it follows that an additional supply of oil to any point in the cable requiring such supply will be more quickly furnished than where it has to flow through a relatively high resistance channel in the cable itself.

What I claim as new and desire to secure by Letters Patent of the United States, is:—

1. The combination of a sheathed cable having a channel containing fluid insulation, pressure reservoirs connected to the channel at spaced intervals to permit fluid to freely flow from and into them, a supply means separate from the cable and containing the same kind of fluid as that used in the cable, and conduit means extending along side of the cable, said means being permanently connected at one point to the supply means and also in parallel to the said pressure reservoirs, the fluid in the supply means and conduit automatically and freely flowing into the reservoirs to compensate for any decrease in the fluid contents thereof.

2. The combination of a sheathed cable having a channel which contains fluid insulation, pressure reservoirs connected to the channel in the cable at spaced intervals so that fluid in the cable is free to flow from and into them, a supply means which contains the same kind of fluid as that used in the cable but under a pressure superior to that within the cable, and which is connected directly to the pressure reservoirs, and means for maintaining predetermined minimum and maximum pressure limits within the reservoirs.

3. The combination of a sheathed cable having a channel containing fluid insulation, sealed pressure reservoirs located at spaced intervals along the length of the cable, conduits permanently connecting the reservoirs in parallel relation to the channel and through which fluid is free to flow at all times, a yielding means forming a part of each reservoir to change its volumetric capacity with transient changes of pressure of the fluid within the channel, a source of supply of the same kind of fluid as that in the channel, and a conduit separate from the cable for conveying fluid from the source directly to the said reservoirs, said conduit being permanently connected in parallel to the reservoirs.

4. The combination of a sheathed cable which is divided into sections, each having a channel containing liquid insulation, the pressure of which varies with temperature changes, sealed pressure reservoirs, conduits for connecting the reservoirs to the channels in the cable sections and through which liquid is free to flow to and from the cable, a yielding means forming a part of each reservoir which freely responds to changes of pressure within the cable, a separate source of supply for feeding liquid to the reservoirs to compensate for any loss of liquid therein, and a means between the source and each reservoir for reducing the pressure of the liquid delivered thereto from said source.

5. The combination of a sheathed cable having a channel which contains liquid insulation, a sealed pressure reservoir, a conduit which connects the channel and the reservoir and through which liquid is free to flow at all times to and from the cable, a yielding means forming a part of the reservoir which permits of changes in the volumetric capacity thereof as the fluid pressure within the cable changes, a separate source of the same kind of liquid that is contained in the cable which supplies the reservoir with liquid to compensate for any loss therefrom, and valve means for reducing the pressure of the liquid admitted to the reservoir from said source, and for maintaining a predetermined minimum pressure on the liquid within the reservoir.

6. The combination of a fluid-filled sheathed cable with an hermetically-sealed pressure reservoir which is in free communication at all times with the interior of the sheath, an elastic means forming a part of the reservoir which freely moves in response to changes of fluid within the sheath to change the volumetric capacity of the reservoir, a supply means which contains the same kind of fluid as that within the sheath and supplies the same under a pressure superior to that in the reservoirs, a conduit connecting the supply means and the pressure reservoir, and means for maintaining predetermined maximum and minimum pressure limits within the reservoir.

7. The combination of a sheathed cable having a channel containing fluid insulation, hermetically sealed pressure reservoirs in free, parallel communication with the channel, a cell having elastic walls located within each of the reservoirs and submerged in the fluid therein contained, said walls moving in response to changes of pressure of the fluid within the channel, a supply reservoir common to the pressure reservoirs, and containing fluid from which air is excluded, a cell having elastic walls forming a part of the supply reservoir and containing fluid, a main conduit receiving fluid from the supply reservoir, and branch conduits connecting the main conduit in parallel to the pressure reservoirs to freely supply fluid to the latter, said main and branch conduits forming the sole connecting means between the supply reservoir and the interior of the cable sheath.

8. The combination of an oil-filled sheathed cable with an hermetically-sealed pressure reservoir which is in free communication with the interior of the sheath, hermetically-sealed cells having elastic walls which are submerged in the oil within the reservoir, a source of oil under an effective pressure superior to that within the reservoir, a connection between the source and the reservoir which contains a pressure-reducing valve, and means associated with the reservoir for discharging oil therefrom to prevent an undue rise of pressure therein.

9. The combination of an oil-filled sheathed cable with a sealed pressure reservoir, individual sealed cells located in and submerged in the oil in the reservoir, each of said cells having an elastic wall, a conduit connecting the reservoir with the sheath and through which oil is free to flow from one to the other, a feeding reservoir comprising a plurality of sealed cells which are connected in parallel and supply oil under a pressure superior to that in the cable, conduit means which supply oil from the feeding reservoir to the pressure reservoir, and valve means for reducing the pressure of the oil delivered by the conduit means to the pressure reservoir.

10. The combination of a sheathed cable having a longitudinal channel containing fluid insulation, a supply reservoir of relatively large capacity, a main conduit independent of the cable connected to the supply reservoir and extending in the direction of the length of the cable and in which the resistance to flow of the fluid is less than that of the channel, relatively small pressure reservoirs connected to the channel at spaced intervals, and branch conduits connecting the main conduit to the pressure reservoirs, said supply reservoir and conduits automatically maintaining within the pressure reservoirs an adequate supply of fluid at all times to completely fill the cable channel.

11. The combination of a sheathed cable having a fluid containing channel, pressure reservoirs, means connecting the reservoirs to the channel at spaced intervals to receive fluid from and return it to the channel as the temperature of the cable changes, a main source of fluid supply separate from the cable, a low resistance conduit separate from the cable, which receives fluid from the main source and supplies it to the reservoirs in parallel, and means connecting the low resistance conduit to each of the reservoirs to automatically supply fluid thereto.

12. The combination of an electric cable having a channel therein containing insulating fluid under pressure above that of the atmosphere, variable capacity pressure reservoirs containing fluid, means for connecting the reservoirs to the channel at spaced intervals to receive fluid from and feed it back to the channel, a safety valve at each reservoir to limit the maximum pressure therein, a feeding reservoir of large capacity supplying fluid at a pressure superior to that in the pressure reservoirs, a pipe line separate from the cable which receives fluid from the feeding reservoir, conduits connecting the pipe line with the pressure reservoirs, and a pressure reducing valve located in each conduit to limit the pressure of the fluid admitted to its reservoir.

WALLACE S. CLARK.